United States Patent [19]

Oaks

[11] 4,242,927
[45] Jan. 6, 1981

[54] METHOD OF MAKING A CUTTING TOOL

[75] Inventor: Ronald R. Oaks, North Tonawanda, N.Y.

[73] Assignee: Niagara Cutter Inc., North Tonawanda, N.Y.

[21] Appl. No.: 32,632

[22] Filed: Apr. 23, 1979

Related U.S. Application Data

[62] Division of Ser. No. 896,738, Apr. 17, 1978, Pat. No. 4,193,719.

[51] Int. Cl.³ ............................................. B21K 5/12
[52] U.S. Cl. ............................................. 76/101 A
[58] Field of Search .................... 76/101 A, 101 R; 407/49, 41, 42, 62, 61, 51, 33, 94, 108, 120

[56] References Cited

U.S. PATENT DOCUMENTS

| | | | |
|---|---|---|---|
| 1,313,628 | 8/1919 | Ford | 407/49 |
| 1,365,180 | 1/1921 | McDonald | 407/49 |
| 1,569,524 | 1/1926 | Noll | 407/49 |
| 2,037,642 | 4/1936 | Scribner | 407/41 |
| 2,234,965 | 3/1941 | DeVlieg | 407/41 |
| 3,378,901 | 4/1968 | Dupuis | 407/41 |
| 3,818,561 | 6/1974 | Montana | 407/49 |

Primary Examiner—Nicholas P. Godici
Assistant Examiner—Roscoe V. Parker
Attorney, Agent, or Firm—Sommer & Sommer

[57] ABSTRACT

An improved cutting tool has general utility, but is particularly adapted for use as a profile-style cutter, or as a form-relieved cutter. The cutting tool includes a body provided with a plurality of slots spaced circumferentially thereabout, a blade arranged in each slot, and a wedge inserted axially into each slot to securely mount the blade on the body. Each blade is provided with a pair of axially-spaced locating shoulders extending rearwardly from its trailing surface, and adapted to embrace the side faces of the body to prevent axial movement of the blade relative to the body. The wedge has a retaining lug extending forwardly beyond its leading surface, and adapted to be slidably inserted into a retaining groove provided in the body. The wedges and blades have cooperative compound tapered surfaces which are adapted to engage one another to cause the blade to seat against the slot base and trailing surfaces, and to prevent radial movement of the blade relative to the body. The invention also provides an improved process of fabricating a rotary cutting tool of the inserted blade type.

3 Claims, 26 Drawing Figures

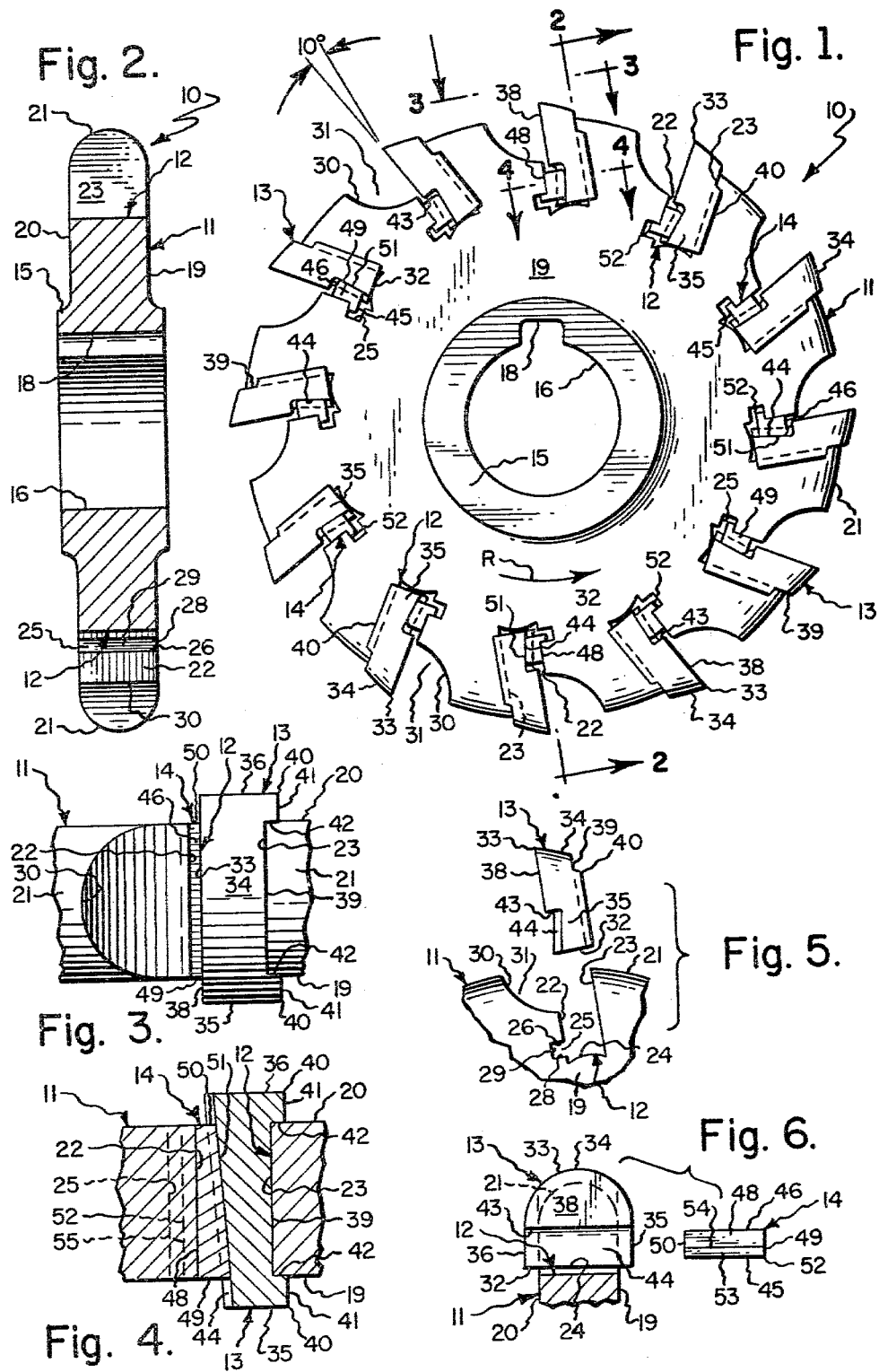

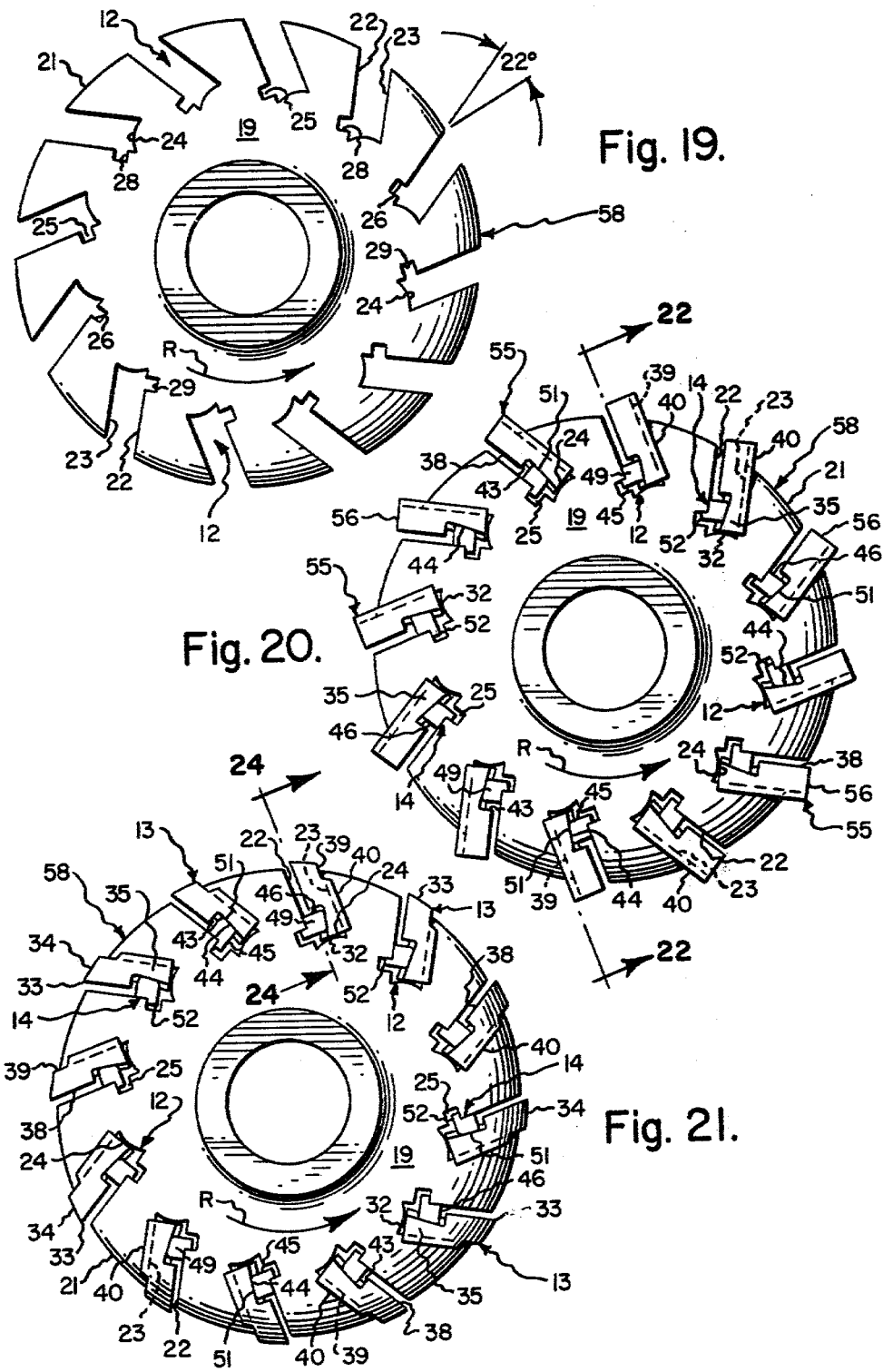

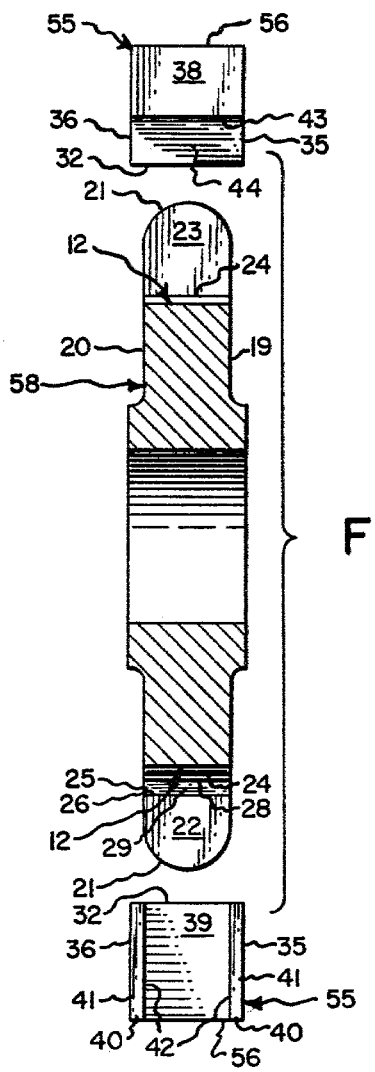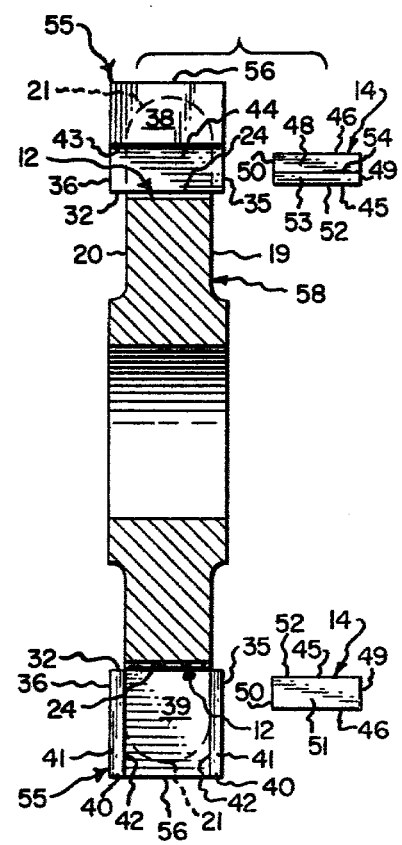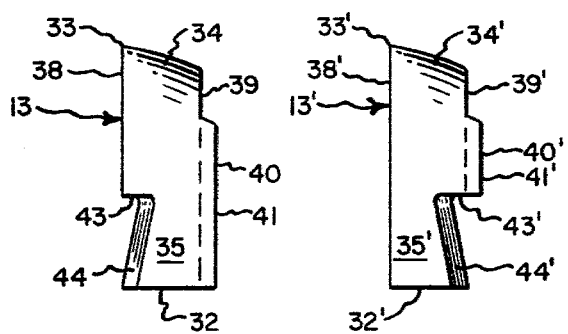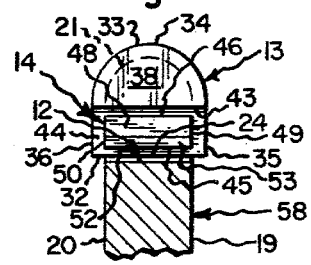

METHOD OF MAKING A CUTTING TOOL

This is a divisional application of pending application Ser. No. 896,738, filed Apr. 17, 1978, now U.S. Pat. No. 4,193,719.

BACKGROUND OF THE INVENTION

1. Field of the Invention

The present invention relates generally to the field of rotatable cutting tools for use in milling operations, and more particularly to an improved cutting tool of the inserted blade type, which is particularly adapted for use as either a form-relieved cutter or as a profile-style cutter.

2. Description of the Prior Art

Many different kinds of cutters are used in milling operations, and such cutters may be broadly classified as being of the solid, tipped or inserted tooth type.

Of particular interest here are "profile-style" milling cutters, in which a land behind the cutting edge is ground to sharpen the cutting tooth, and "form-relieved" milling cutters, in which the face of the tooth is ground to sharpen the cutting edge. These kinds of milling cutters are particularly useful in imparting a non-planar profile to a workpiece.

However, upon information and belief, known "form-relieved" milling cutters have heretofore been of the solid type, and difficulty has been experienced in resharpening the tooth. In the case of "profile-style" cutters, special equipment is required to manipulate the tool such that a land may be reground without contacting the face of an adjacent tooth. In the case of "form-relieved" cutters, some difficulty has been experienced in initially forming the desired profile, and in subsequently regrinding the face of the tooth. Of course, another disadvantage of the solid type of milling cutter is that damage to only one tooth might require that the entire cutter be resharpened, or otherwise repaired. In either case it is important to provide a measure of radial relief behind the cutting edge.

Upon information and belief, the resistance of the industry to provide "profile-style" or "form-relieved" milling cutters of the inserted tooth type, has stemmed largely from the practical difficulties in accurately remounting a tooth in the same position it was in before removal.

SUMMARY OF THE INVENTION

The present invention overcomes the deficiencies of the prior art by providing an improved cutting tool of the inserted blade or tooth type, which is particularly suited for use as, but not limited to, either a "profile-style" cutter or a "form-relieved" cutter.

The improved cutting tool broadly includes a body, a blade, and a wedge. The body has opposite side faces and a slot therebetween bounded by spaced and facing leading and trailing wall surfaces separated by an intermediate base surface. One of the body wall surfaces has a retaining groove recessed therein and extending from one of the body side faces toward the other. The blade is arranged in the body slot and has leading and trailing surfaces, one of which engages that body wall surface which is not provided with the retaining groove. The blade also has an inner end face opposing, and preferably contacting, the body base surface. The wedge is arranged in the body slot between the blade and that one of the body wall surfaces which is provided with the retaining groove. The wedge has leading and trailing wall surfaces, one of which engages such one of the body wall surfaces and the other of which engages the opposing one of the blade surfaces. The wedge also has a retaining lug received in the retaining groove to prevent movement of the wedge in a direction away from the body base surface. The opposing and contacting surfaces between the wedge and blade are tapered or inclined so that relative movement therebetween urges the blade toward the body wall surface which is not provided with the retaining groove.

The invention also provides an improved process of fabricating a form-relieved inserted blade rotary cutter, which comprises the steps of: forming a rotatable fixture body having opposite radial side faces joined by a peripheral surface and provided with a plurality of circumferentially-spaced slots extending between the fixture body side faces and opening to the fixture body peripheral surface, each of these fixture body slots being bounded by spaced and facing leading and trailing wall surfaces having a radial rake and separated by an intermediate base surface; forming a blade blank having inner and outer ends and leading and trailing surfaces, one of which is provided with a locating groove having a width corresponding to the axial thickness of the fixture body between its side faces; inserting such a grooved blade blank in each such fixture body slot with its inner end against the fixture body base surface and the base of such blade locating groove against the opposing one of the fixture body wall surfaces; wedging the blade blank in the fixture body so that the blade blank is axially and radially held in a predetermined position relative to the fixture body; shaping the outer end of the blade blank to a form concentric with the axis of rotation of the fixture body; removing such shaped blades from the fixture body; forming a rotatable cutter body having a similar thickness and slot configuration as for said fixture body except that the effective radial rake of such cutter body slot is less than the radial rake of the fixture body slot; and inserting and wedging such shaped blades in such cutter body slot in a manner similar to that followed for said fixture body, the shaped blades when so mounted on the cutter body severally having radial relief behind the cutting edge of predetermined profile of each such blade, and permitting repeated blade sharpenings while maintaining such profile.

Accordingly, one general object of the present invention is to provide an improved cutting tool.

Another general object is to provide an improved process for fabricating a form-relieved or profile-style rotary cutting tool of the inserted blade type.

Another object is to provide an improved form-relieved or profile-style rotary cutting tool of the inserted blade type.

Another object is to provide an improved form-relieved cutting tool which facilitates resharpening.

These and other objects and advantages will become apparent from the foregoing and ongoing written specification, the drawings, and the appended claims.

BRIEF DESCRIPTION OF THE DRAWINGS

FIG. 1 is a side elevation of the left face of the improved cutting tool, this view showing the sharpened blades as being held within the body slots by the wedges.

FIG. 2 is a sectional view thereof, taken generally on line 2—2 of FIG. 1, showing the body slot leading and trailing wall surfaces in elevation.

FIG. 3 is an enlarged fragmentary view thereof, taken generally on line 3—3 of FIG. 1, showing a top plan view of one of the blades retained in a body slot.

FIG. 4 is an enlarged fragmentary view thereof, taken generally on line 4—4 of FIG. 1, this view particularly showing the area contact between the cooperative tapered surfaces of the blade and wedge.

FIG. 5 is a fragmentary left side elevation of a part of the body, this view showing a blade in exploded aligned relation to one of the body slots.

FIG. 6 is a fragmentary view thereof, showing in front elevation, the leading surface of a blade arranged in a body slot, and a separated wedge.

FIG. 19 is a left side elevation of a fixture body used to initially hold the blade blanks while being shaped to form a cutting edge of the desired contour by a conventional cylindrical grinding or machining technique.

FIG. 20 is a similar left side elevation of the fixture body, and showing the unground blade blanks retained in the slots by the wedges.

FIG. 21 is a similar left side elevation of the assembly of fixture body, blades and wedges depicted in FIG. 20, but showing the configuration of the blades after they have been shaped to form a cutting edge of the desired contour.

FIG. 22 is a sectional view of the fixture body, taken generally on line 22—22 of FIG. 20, showing the slot leading and trailing wall surfaces in elevation, and showing front and rear elevations of two blade blanks in radially exploded aligned relation to such slots.

FIG. 23 is a view similar to FIG. 22, but showing the two blade blanks as positioned in their respective slots, with the associated wedges illustrated in laterally or axially exploded aligned relation thereto.

FIG. 24 is a fragmentary sectional view thereof, taken generally on line 24—24 of FIG. 21, depicting in front elevation a wedge positioned ahead of a blade.

FIG. 25 is an enlarged left side elevation of a blade, this view being similar to FIG. 8, showing the compound tapered surface arranged beneath the leading surface thereof.

FIG. 26 is a left side elevation of a modified blade wherein the compound tapered surface thereof is provided beneath the blade trailing surface.

DESCRIPTION OF THE PREFERRED EMBODIMENTS

Figure 7:
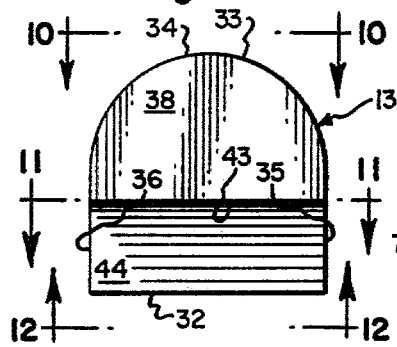
FIG. 7 is an enlarged front elevational view of a blade showing the leading surface thereof.
Figure 8:
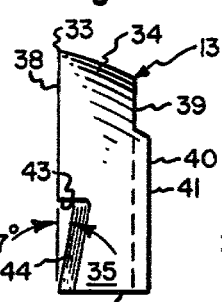
FIG. 8 is a left side elevation of the blade, this view being taken from the right of FIG. 7.
Figure 9:
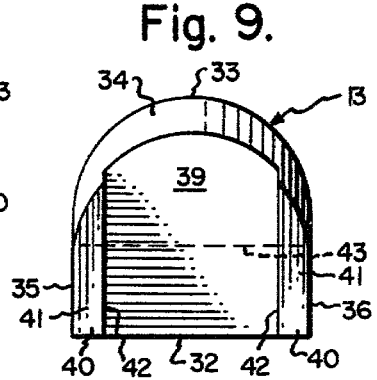
FIG. 9 is a rear elevation of the blade, this view being taken from the right of FIG. 8.
Figure 10:
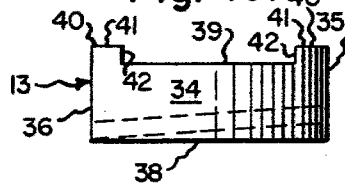
FIG. 10 is a top plan view of the blade, this view being taken generally on line 10—10 of FIG. 7.

At the outset, it should be clearly understood that like reference numerals are intended to identify the same elements, portions or surfaces consistently throughout the several drawing figures, as such elements, portions or surfaces may be further described or explained by the entire written specification of which this detailed description is an integral part.

As used herein, the terms "leading" and "trailing" are intended to relate to the direction of tool movement during cuting. Such movement is preferably rotative and indicated by the arrow R in FIGS. 1 and 19-21.

Referring now to the several drawing figures, and more particularly to FIG. 1 thereof, the invention broadly provides an improved cutting tool, of which the presently preferred embodiment is generally indicated at 10.

This cutting tool 10 is shown as broadly including a body, generally indicated at 11, provided with a plurality of circumferentially-spaced slots 12; a corresponding plurality of blades, severally indicated at 13, arranged in such body slots; and a corresponding plurality of wedges, severally indicated at 14, each associated with a body slot and blade in the manner hereinafter described.

Referring now to FIGS. 1-5 the body 11 is shown as being a rotatable member having a central axially-thickened hub portion 15 provided with a horizontal axial through-opening 16 and a horizontal keyway 18; intermediate annular vertical left and right side faces 19, 20 extending radially outwardly from hub portion 15; and an outer substantially semi-cylindrical peripheral surface 21 joining the outermost margins of side surfaces 19, 20. As best shown in FIG. 1, the body peripheral surface 21 is interrupted by the presence of a plurality of circumferentially-spaced slots 12 extending into the body from peripheral surface 21 and communicating the body left and right side faces 19, 20. In the illustrated embodiment, twelve of these slots 12 are spaced equally about the body at nominal intervals of thirty degrees, although a greater or lesser number of such slots could be provided if desired.

Adverting now to FIGS. 1, 2 and 5, each slot 12 is shown as being bounded by spaced and facing leading and trailing planar wall surfaces 22, 23 extending inwardly of the body and separated by an intermediate lower crowned or convex base surface 24 extending in an axial direction. While it is presently preferred that the base surface 24 be outwardly crowned in the manner illustrated, it should be clearly understood that such surface could be planar or have some other shape or configuration, if desired. An axial rectangular retaining groove 25 is shown as extending forwardly into the body from each slot leading surface 22 for a purpose hereinafter explained. Specifically, this groove or recess 25 is bounded by upper and lower parallel planar surfaces 26, 28, and an intermediate perpendicular leading surface 29. Each of surfaces 26, 28 and 29 extends the full width of the body to join the body left and right side faces 19, 20, thereby to define an axially-extending rectangular groove 25 recessed into the body from body leading wall surface 22 and arranged to face the body trailing wall surface 23. While this configuration is presently preferred, it should be clearly understood that such retaining groove 25 could alternatively be recessed into the body trailing wall surface 23, if desired.

In the illustrated embodiment, the body leading and trailing wall surfaces 22, 23 are substantially parallel to one another, and are inclined at a positive radial rake angle of about 10° (FIG. 1). Moreover, an axially-extending concave fillet surface 30 communicates the outer margin of the body leading wall surface 22 with the body peripheral surface 21 to define a chip space or flute 31 immediately ahead of each blade.

Figure 11:
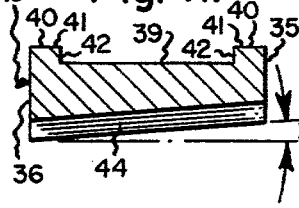
FIG. 11 is a horizontal sectional view of the blade, taken generally on line 11—11 of FIG. 7, and particularly showing the blade compound tapered surface.
Figure 12:
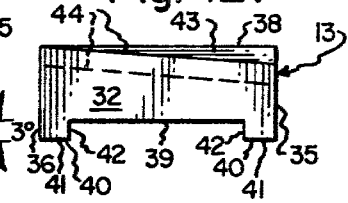
FIG. 12 is a bottom plan view of the blade, taken generally on line 12—12 of FIG. 7.
Figures 13, 14:
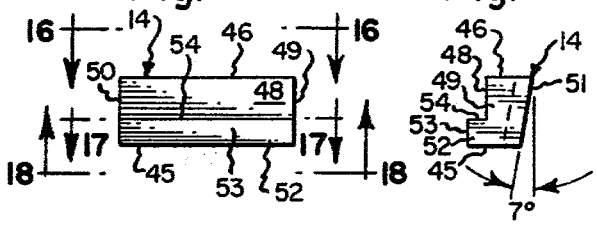
FIG. 13 is an enlarged front elevational view of a wedge, showing the leading surface thereof.
FIG. 14 is a left side elevation of the wedge, this view being taken from the right of FIG. 13.
Figure 15:
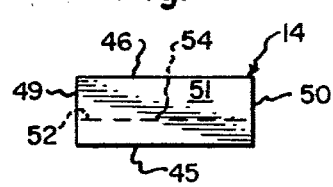
FIG. 15 is a rear elevation of the wedge, this view being taken from the right of FIG. 14.
Figure 16:
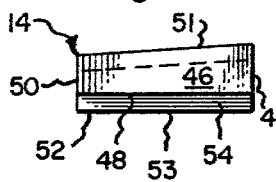
FIG. 16 is a top plan view of the wedge, this view taken generally on line 16—16 of FIG. 13.

Referring now to FIGS. 7-12, each blade 13 is shown as being an integrally-formed member machined or ground to have a unique configuration. Structurally, blade 13 has a lowermost planar horizontal bottom or inner end face 32, an opposite upper convex semi-cylindrical outer surface 34, and left and right side surfaces 35, 36 joining lower and upper blade surfaces 32, 34. Each blade is shown as further including a planar vertical front face or leading surface 38, and a planar vertical trailing surface 39. At least one, and preferably two, vertically-elongated axially-spaced locating abutments, severally indicated at 40, extend rearwardly beyond the blade trailing surface 39 to join bottom face 32, upper surface 34, and the adjacent side face. Each locating abutment 40 has a rearwardly-facing planar vertical surface 41, and a planar vertical inward surface or shoulder 43 joining rear surface 41 with blade trailing surface 39, and arranged to face the other locating abutment. The blade further includes a downwardly-facing horizontal surface 43 immediately beneath blade leading surface 38, and an upwardly and leftwardly inclined or tapered planar surface 44 joining the blade bottom, left and right surfaces 32, 35 and 36 with downwardly-facing trapezoidal-shaped surface 43. Specifically, the compound tapered surface 44 is shown as being inclined upwardly and rearwardly at an angle of about 7° with respect to the vertical (FIG. 8), and as also being inclined leftwardly and rearwardly at an angle of about 3° with respect to the horizontal (FIG. 11). However, while the respective tapers of three and seven degrees have been found to be acceptable, and are preferred, the shape of the blade and wedge tapered surfaces should not be limited by the precise angles of taper of the disclosed embodiment. The front face or leading surface 38 of the blade intersects ground outer surface 34 to define a cutting edge 33.

Before proceeding, it should be understood that while the surface 34 of the blade is specifically shown and described as being semi-cylindrical, this surface may be configured to other shapes, profiles or contours as well. Indeed, inasmuch as the improved cutting tool may operate as a form-relieved cutter (i.e., one in which the tool is resharpened by grinding back the blade leading surface 38), the present invention expressly contemplates that the blade outer surface 34 may have virtually any shape or configuration necessary to impart a corresponding shape or profile to the workpiece. It is also intended that the blade blanks may be ground or machined to the specific profile desired.

Figure 17:
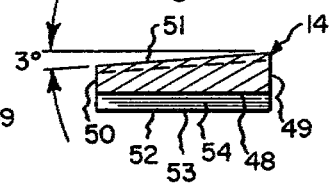
FIG. 17 is a horizontal sectional view thereof, taken generally on line 17—17 of FIG. 13, and particularly showing the compound tapered surface of the wedge.
Figure 18:
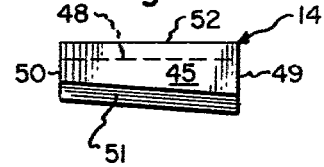
FIG. 18 is a bottom plan view of the wedge, this view taken generally on line 18—18 of FIG. 13.

Referring now to FIGS. 13-18, the wedge 14 is also shown as being an integrally-formed structural member configured to cooperate with the shape of body slot 12 and blade 13. The wedge is shown as being horizontally elongated, and as having a trapezoidal horizontal bottom surface 45, a trapezoidal horizontal top surface 46, a rectangular planar vertical leading surface 48, a planar vertical left end face 49, a planar vertical right end face 50, and a compound tapered planar trailing surface 51. Specifically, this tapered surface 51 is shown as being inclined upwardly and rearwardly at an angle of about 7° with respect to the vertical (FIG. 14), and as also being inclined rightwardly and forwardly at an angle of about 3° with respect to the horizontal (FIG. 17). Moreover, a horizontally-elongated retaining lug 52 extends forwardly beyond wedge leading surface 48. Specifically, this retaining lug 52 is bounded by vertical planar surface 53 extending upwardly from bottom surface 55, and an upwardly-facing horizontal planar surface 54 extending rearwardly from surface 53 to join the lower margin of wedge leading surface 48. In this manner, the wedge 14 is configured to cooperate with the shape of body slot 12 and blade 13.

Adverting now to FIGS. 1-6, each blade 13 is positioned in an empty body slot 12 such that the blade inner end face 32 engages the slot crowned base surface 24 in line or point contact, with the blade trailing surface 39 engaging the slot trailing surface 23 in substantially full area contact. In this position, the blade locating shoulders 42, 42 are arranged closely adjacent, and preferably contact, the body side faces 19, 20. Inasmuch as these blade locating shoulders 42, 42 function to restrain axial movement or shifting of the blade relative to the body, the more closely that blade shoulder surfaces 42, 42 are positioned adjacent the blade side faces, the less likely that the blade will move axially relative to the body.

After the blade has been initially positioned, the wedge 14 may be slidably inserted into the slot from the left side of the body to securely hold the blade in the slot against both axial and radial movement. As best shown in FIGS. 1 and 4, the wedge retaining lug 52 is adapted to be slidably received in slot retaining groove 25 such that wedge surfaces 53, 54 face retaining groove surfaces 29, 26, respectively. At the same time, the wedge trailing surface 51 is provided with a compound taper complementary to that of blade surface 44, so that these two surfaces will engage one another in substantially full area contact (FIG. 4) when the wedge is inserted. In this regard, persons skilled in this art will appreciate that the 3° horizontal taper of surfaces 44, 51 will cause the blade trailing surface 39 to move into substantially full area contact with the slot trailing wall surface 23. At the same time, the 7° vertical taper of surfaces 44, 51 will force the blade to move more deeply into the slot such that the blade inner end face 32 will firmly engage the slot crowned base surface 24. It should also be noted that because the wedge retaining lug 52 is received in slot retaining groove 25, the wedge is restrained from moving radially outwardly during such insertion. Thus, insertion of the wedge causes the blade to seat firmly against the slot trailing surface and the slot base surface. Also, it should be appreciated that the direction of the compound tapered surfaces 44, 51 prevents the blade from moving radially outwardly when the cutting tool 10 is rotated, such rotation being in the direction of arrow R in FIG. 1.

Therefore, the invention provides an improved cutting tool 10 of the insertable blade type, which possesses general utility in various machining operations, and which is a particularly adapted for use as either a profile-style cutter or a form-relieved cutter. In this regard, persons skilled in this art will recognize that one advantage of the improved cutter 10 is that should any individual blade become defective or break so as no longer to be usable, it can be readily replaced by driving out the wedge, removing the defective blade, inserting a new blade having a suitably dimensioned cutting edge compatible with that of the retained blades, and driving in the wedge to lock the new blade in place. In this manner a whole cutter does not have to be scrapped.

As the result of use, the inventive cutter will require sharpening from time to time. This is readily performed in the normal manner using conventional equipment by grinding the front face 38 of each blade in situ on the cutter body. Since the shape of the outer surface 34 of a blade is the same over the entire blade length between blade surfaces 38 and 39, grinding off metal on the blade front face 38 while maintaining parallelism with the original front face, will produce a new sharp cutting edge 33.

The manner by which the blades are initially formed or contoured to the desired shape or profile is illustrated in FIGS. 19–24.

The finished blades 13 are formed from blanks 55 which are configured as previously described, except that the upper semi-cylindrical surface 34 is not yet provided. Thus, in FIGS. 20, 22 and 23, the blade blanks 55 are shown as being substantially rectangular members, with the parallel blade leading and trailing surfaces 38, 39 continuing outwardly and joined by a mutually perpendicular planar top surface 56. With the exception that the blade surface 34 is as yet unprovided, the blade blanks are otherwise configured as previously described.

Referring now to FIG. 19, the invention contemplates that a master or fixture body, generally indicated at 58, be formed substantially identical to the cutter body 11 previously described, with the exception that each of the slot leading and trailing wall surfaces 22, 23 are inclined at a positive radial rake angle of about 22°. However, this particular angle is not regarded as being unique or critical, and may be readily varied to modify the extent of radial relief of the finished blades. Additionally, the keyway 18 and the flutes 31 are shown as being omitted from fixture body 58. Although the fixture body 58 is also shown as being provided with twelve of slots 12, the number and spacing of such master body slots is not deemed as being important. Otherwise, the disclosed fixture body 58 is configured to be substantially identical to the cutter body 11, previously described. Although the diameter of the fixture body 58 is shown as being the same as that of the cutter body 11, the fixture body may have a different diameter with an accompanying adjustment in its rake angle.

The blade blanks 55 are initially positioned in fixture body slots 12, and are secured in this position by axial insertion of wedges 14, as previously described. Inasmuch as the fixture body slots 12 are structurally identical to the cutter body slots, insertion of each wedge 14 causes the blade to seat firmly against the slot trailing wall surface 23, and against the slot base surface 24.

After the blade blanks 55 have been so mounted on the fixture body 58, the assembly thus formed may be subjected to a conventional cylindrical grinding operation (not shown) to grind the blade blank outer surfaces 56 down to form the semicylindrical convex outer surfaces 34 of the finished blades, as shown in FIGS. 21 and 24, or whatever profile is desired. Thus, the invention is not limited to the provision of blades 13 with a semi-cylindrical outer surface 34. Persons skilled in this art will appreciate that such cylindrical grinding operation may be utilized to import a myriad of different shapes, outlines or profiles to the blades, as desired. Instead of forming the blade outer surfaces 34 by grinding, any other suitable machining technique may be employed.

After the blade blanks have been so ground, or otherwise machined, to provide the blade outer surfaces 34, the finished blades may be removed from the fixture body 58, and assembled on the cutter body 11. However, since the positive radial rake angle of the cutter body leading and trailing wall surfaces 22, 23 is about 10°, as opposed to 22° for the fixture body, the blade ground surfaces 34 will provide a measure of radial relief immediately behind the blade cutting edge 33, while maintaining the circumferential form of the desired profile. The present invention expressly contemplates that the extent of the radial rake angles of the fixture and cutting body slots may be modified, as desired, to vary the extent of such radial relief.

The improved cutting tool 10 may be used as a "form-relieved" cutter (i.e., resharpened by grinding the blade leading surface 38), or as a "profile-style" cutter (i.e., resharpened by grinding a narrow land on surface 34 immediately behind the cutting edge), or as some other type of insertable blade cutter. Providing cutter blades separate from the cutter body, permits the body to be made of cheaper steel than that used for the blades, thus providing a less expensive cutting tool. Also, by having separate blades, the expense and use of special costly equipment to form cutting teeth, having radial relief behind the cutting edge, on an integral body is eliminated.

In addition to providing an improved cutting tool, the present invention also provides an improved process of fabricating a rotary cutter of the inserted blade type, and particularly a "form-relieved" or "profile-style" milling cutter. This method broadly comprises the steps of: forming a rotatable fixture body 58 having opposite radial side faces 19, 20 joined by a peripheral surface 21 and provided with a plurality of circumferentially-spaced slots 12 extending between such fixture body side faces and opening to such fixture body peripheral surface, each of such fixture body slots being bounded by spaced and facing leading and trailing wall surfaces 22, 23 separated by an intermediate base surface 24 and also having a radial rake; forming a blade blank 55 having inner and outer ends 32, 56 and leading and trailing blade surfaces 38, 39, one of which is provided with a locating groove (between abutments 40, 40) having a width corresponding to the thickness measured axially of the fixture body between its side faces; inserting such a grooved blade blank in each such fixture body slot with its inner end against such fixture body base surface and with the base of such blade locating groove against the opposing one of the fixture body wall surfaces; wedging such blade blank in the fixture body so that the blade blank is axially and radially held in a predetermined position relative to the fixture body; shaping the outer end of the blade blank to a form 34 concentric with the axis of rotation of the fixture body; removing the shaped blade 13 from the fixture body; forming a rotatable cutter body having a similar thickness and slot configuration as for the fixture body except that the radial rake of the cutter body slots is less than that of the fixture body slots; and inserting and wedging the shaped blades in the cutter body slots in a manner similar to that followed for the fixture body, the shaped blades when so mounted on the cutter body severally having radial relief on the trailing side of the cutting edge 33 of predetermined profile of each such blade, and permitting repeated blade sharpenings while maintaining such profile.

The present invention contemplates considerable latitude in modifying the structure of the preferred embodiment disclosed herein. For example, the cooperative radial rake angles of the cutter and fixture bodies may be changed to vary the extent of radial relief behind the cutting edge of each blade. If desired, the retaining groove may be recessed in the slot trailing wall surface, for use with the modified blade 13' shown in FIG. 26. In this modification, the compound tapered surface 44' is provided on the rear of the blade 13', immediately beneath the shortened blade trailing surface 39' and locating shoulders 40'. Also, the blade leading surface 38' extends the full height of the blade to join the blade inner end face 32' with the blade outer surface 34'. Also, in this modification the wedge would be configured substantially as a minor image of wedge 14.

The blade outer face or surface 34 may be formed to any shape, profile, contour or outline desired, and the extent of the tapers of cooperative surfaces 44, 51 may be varied as desired. The slot leading and trailing wall surfaces 22, 23 need not necessarily be parallel to one another, as shown. While it is preferred that the slot base surface 25 be convex, rounded or crowned, so as to provide line or point contact with the blade inner end face 32, this crowned configuration need not invariably obtain. Such slot base surface 25 may be planar, if desired. Moreover, while the preferred embodiment is provided with two of locating abutments 40, so arranged as to embrace the cutter body therebetween, such locating abutments may be entirely omitted, or only one need be provided, such as to restrain movement of the blade from an axial thrust in only one direction. Alternatively, some other type of key-keyway connection between the blade and body may be provided. In addition, the slots 12 could be provided with an axial rake angle, or alternating slots could be provided with different axial rake angles, again as desired.

As a further possible modification, the invention contemplates that the slot leading wall surface 22 and the wedge leading surface 48 could be provided with an upwardly and rearwardly extending inclination or taper, in lieu of the positive retaining groove-lug connection disclosed herein. In other words, if the slot leading surface 22 were inclined so as to converge outwardly with slot trailing surface 23, or an imaginary extension thereof, the wedge could be provided with a cooperative inclined or tapered forward surface which would cause the blade to seat against both the slot trailing and base surfaces, when the wedge was inserted. Thus, the provision of such a tapered or inclined connection between the slot and wedge leading wall surfaces, as an equivalent alternative to the retaining groove-lug connection, should be regarded as being within the scope of the invention. In either case, the retaining lug-groove connection or the alternative inclined-surface connection between the wedge and body, constitute means for preventing movement of the wedge in a direction away from the body base surface.

While the blades 13 may be formed of high speed steel, or equivalent, the particular material of which the blades are formed is deemed to be well within the ambit of a person having ordinary skill in this art.

Persons skilled in this art will readily appreciate that the improved cutting tool may also be used as a "profile-style" milling cutter, that is, one in which a land is ground behind the cutting edge to sharpen the tooth or blade, or as some other suitable type of linearly or rotatably movable cutting tool.

Therefore, while the presently preferred embodiment of the improved cutting tool has been shown and described, and several modifications thereof discussed, persons skilled in this art will appreciate that various additional changes and modifications may be made without departing from the spirit of the invention, as defined by the following claims.

What is claimed is:

1. A process of fabricating an inserted blade rotary cutting tool, comprising the steps of:

forming a rotatable fixture body having opposite radial side faces joined by a peripheral surface and provided with at least one slot extending between such fixture body side faces and opening to such fixture body peripheral surface, said fixture body slot being bounded by spaced and facing leading and trailing wall surfaces separated by an intermediate base surface and also having a radial rake;

forming a blade blank having inner and outer ends and leading and trailing blade surfaces, one of which is provided with a locating groove having a width corresponding to the thickness measured axially of said fixture body between its said side faces;

inserting such grooved blade blank in said fixture body slot with its said inner end against such fixture body base surface and with the base of such blade locating groove against the opposing one of said fixture body wall surfaces;

wedging said blade blank in said fixture body slot such that said blade blank is axially and radially held in a predetermined position relative to said fixture body;

shaping the outer end of said blade blank to concentric form with respect to the axis of rotation of said fixture body;

removing such shaped blade from said fixture body;

forming a rotatable cutter body having a similar thickness and slot configuration as for said fixture body except that the radial rake thereof is less than that for said fixture body slot;

and inserting and wedging said shaped blade in said cutter body slot in a manner similar to that followed for said fixture body, the shaped blade when so mounted on said cutter body having a radial relief on the trailing side of the cutting edge of predetermined profile, and permitting repeated blade sharpenings while maintaining said profile.

2. A process according to claim 1, comprising the further steps of:

forming an axially-extending retaining groove in one of said fixture body wall surfaces;

forming a wedge having a retaining lug;

wherein said wedging is performed by driving said wedge axially between said blade blank and that one of said fixture body surfaces provided with said retaining groove with said lug interlocking in such groove to prevent radially outward movement of said wedge, there being camming action between the opposing and contacting surfaces of said wedge and said blade blank to urge said inner end of said blade blank radially inwardly against said fixture body base surface, said blade blank being held against axial movement by the side walls of its said locating groove engaging said fixture body radial side faces;

and said wedge is driven out of said fixture body to release said shaped blade, before said shaped blade is similarly mounted on said cutter body which had also been previously formed with an axially-extending retaining groove.

3. A process of fabricating a rotary cutting tool of the inserted blade type, comprising the steps of:

forming a rotatable fixture body having opposite radial side faces joined by a peripheral surface and provided with at least one slot extending between said fixture body side faces and opening to such fixture body peripheral surface, said fixture body slot being bounded by spaced and facing leading and trailing wall surfaces separated by an intermediate base surface, one of said body wall surfaces being disposed at a radial rake angle to the axis of said body;

forming a blade blank having inner and outer ends and leading and trailing wall surfaces, one of which is provided with a locating groove having a width corresponding to the thickness measured axially of said fixture body between its said side faces;

inserting such grooved blade blank in said fixture body slot with its said inner end against said fixture body base surface and with said blade locating groove against the said one of said fixture body wall surfaces;

wedging said blade blank in said fixture body slot such that said blade blank is axially and radially held in a predetermined position relative to said fixture body;

shaping the outer end of said blade blank to form a cutting edge and profile concentric with the axis of rotation of said fixture body;

removing such shaped blade from said fixture body;

forming a rotatable cutter body having a similar thickness and slot configuration as for said fixture body except that one of such cutter body leading and trailing wall surfaces has an effective radial rake angle less than said radial rake angle of said one of said fixture body wall surfaces; and inserting and wedging said shaped blade in said cutter body slot in a manner similar to that followed for said fixture body, the shaped blade when so mounted on said cutter body providing radial relief of said profile behind said cutting edge, and permitting repeated blade sharpenings while maintaining said profile.

* * * * *